United States Patent
Rebec et al.

(10) Patent No.: US 6,175,717 B1
(45) Date of Patent: *Jan. 16, 2001

(54) GLOBAL MOBILE VIDEO COMMUNICATIONS SYSTEM

(75) Inventors: Mihailo V. Rebec; Mohammed S. Rebec, both of Bristol, IN (US)

(73) Assignee: Trans Video Electronics, Inc., Washington, DC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/215,770

(22) Filed: Mar. 21, 1994

Related U.S. Application Data

(63) Continuation-in-part of application No. 08/085,329, filed on Jul. 2, 1993, now Pat. No. 5,594,936, which is a continuation-in-part of application No. 08/047,089, filed on Apr. 16, 1993, now Pat. No. 5,740,214.

(51) Int. Cl.[7] ........................................... H04H 1/00
(52) U.S. Cl. ........................ 455/3.2; 343/711; 348/722
(58) Field of Search ............................ 343/711, 712, 343/713, 714, 717, 757, 758, 759; 342/352; 364/919.3; 455/3.2; 348/722; 296/24.1

(56) References Cited

U.S. PATENT DOCUMENTS

| | | |
|---|---|---|
| 4,672,655 | 6/1987 | Koch . |
| 4,672,656 | 6/1987 | Pfeiffer et al. . |
| 4,710,813 * | 12/1987 | Wallis et al. . |
| 4,866,787 | 9/1989 | Olesen . |
| 4,979,170 | 12/1990 | Gilhousen et al. . |
| 5,019,910 | 5/1991 | Filmer . |
| 5,023,934 | 6/1991 | Wheeless . |
| 5,029,232 | 7/1991 | Nall . |
| 5,057,932 * | 10/1991 | Lang . |
| 5,157,491 | 10/1992 | Kassatly . |
| 5,166,789 * | 11/1992 | Myrick et al. . |
| 5,239,540 | 8/1993 | Rovira et al. . |
| 5,249,303 | 9/1993 | Goeken . |
| 5,262,875 | 11/1993 | Mincer et al. . |
| 5,398,035 * | 3/1995 | Densmore et al. ............. 343/713 |
| 5,490,704 * | 2/1996 | Calnan ............................. 296/24.1 |
| 5,539,452 * | 7/1996 | Bush et al. ........................ 348/17 |

OTHER PUBLICATIONS

"Inmarsat Product Portfolio", Jan. 9, 1993.*
"Trimble Navigation Introduces System" Satellite Week (abstract only), Oct. 1991.*
Yasuda et al. (Communications, 1989. ICC '89, Bostonnicc/89. Conference record. 'World Prosperity Through Communications', IEEE International Conference on, 1989, pp. 204–210 vol. 1.).*

* cited by examiner

Primary Examiner—Nathan Flynn
(74) Attorney, Agent, or Firm—Fleshner & Kim, LLP

(57) ABSTRACT

A mobile can transmit and receive broadcast quality video signals while in motion. The system includes a power generator and a microwave subsystem coupled to said power generator. The microwave subsystem transmits first local microwave signals modulated with first local digital data while in motion with respect to earth and also receives first remote microwave signals modulated with first remote digital data while in motion with respect to earth. A high speed digital station receives a video signal and transforms and compresses the video signal into the first local digital data and transforms and decompresses the first remote digital data into a first decompressed remote digital data. The mobile microwave system is housed in a vehicle which has a lower portion and an upper portion, wherein the first local microwave signals can pass through the upper portion.

10 Claims, 14 Drawing Sheets

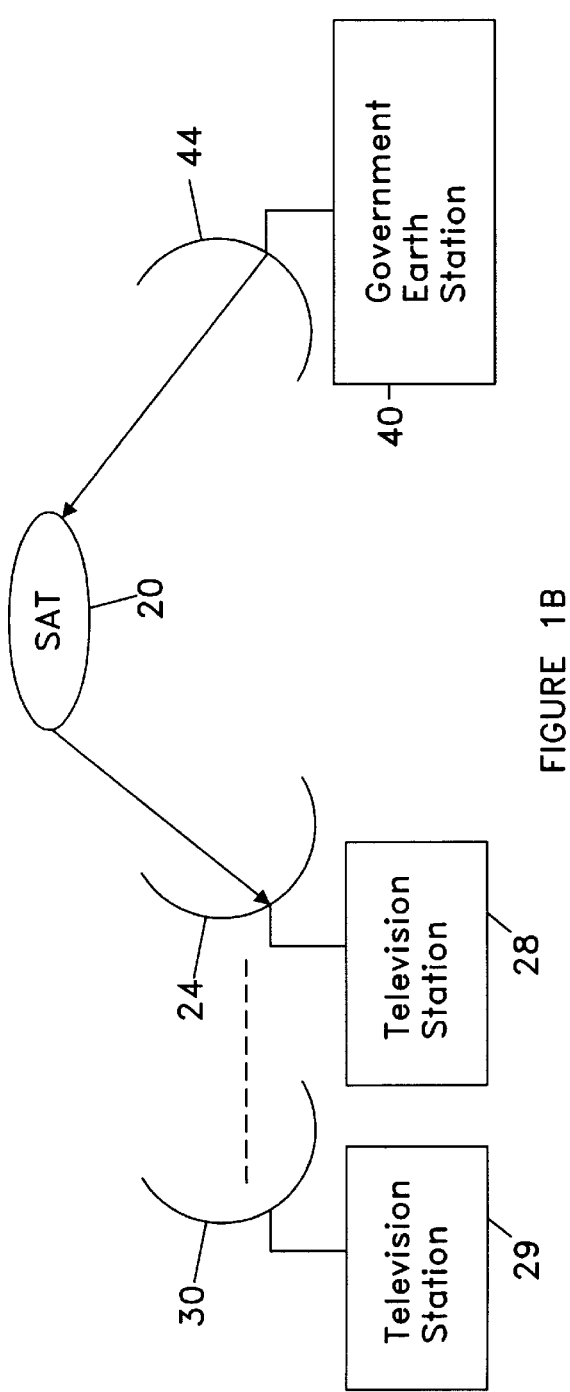
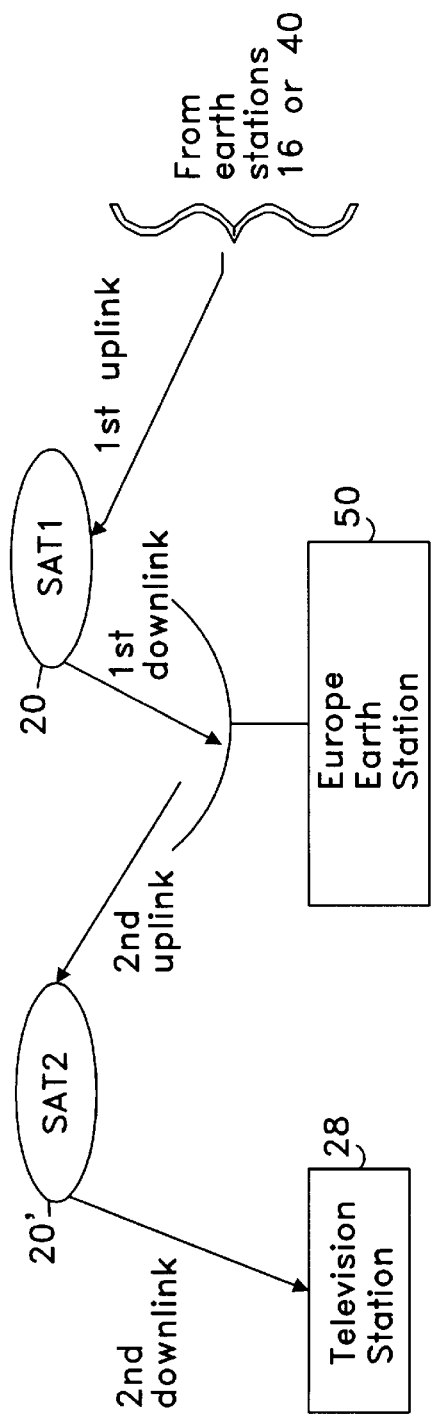
FIGURE 1B
FIGURE 1C

GLOBAL MOBILE VIDEO COMMUNICATIONS SYSTEM

RELATED APPLICATIONS

This application is a continuation-in-part of U.S. patent application Ser. No. 08/085,329, filed Jul. 2, 1993, now U.S. Pat. No. 5,594,936, which in turn was a continuation-in-part of U.S. patent application Ser. No. 08/047,089, filed Apr. 16, 1993, now U.S. Pat. No. 5,740,214, the contents of both of which are incorporated herein by reference.

BACKGROUND OF THE INVENTION

1. Field of the Invention

This invention relates generally to an apparatus and method for transmitting information from one location to another and in particular to a global satellite communications vehicle capable of receiving and forwarding information including video and other sensor information from a remote location in real time even while the vehicle is moving.

2. Description of Related Art

A news team frequently has to transmit a video clip of a news story at some remote location site back to a home television station. Typically, the news team accomplishes this by either using their own earth station with a satellite dish and uplink electronics or renting such an earth station from a third party. Often, however, the television station cannot afford such an earth station or none is available from a third party and consequently the news team must rely on nearby government ministry-owned satellite earth station.

FIG. 1A shows a truck 10 with a satellite dish 16 which together serve as a point-of-origin independent work station 14. In order to be point-of-origin independent, work station 14 must use the C or Ku-band and consequently the diameter of the dish 16 must be at least 10 to 15 meters. Truck 10 contains all uplink electronics required to transmit microwave signals in the C or Ku band. A video signal is modulated onto a microwave signal and then amplifies and transmits the microwave signal to a satellite 20 typically owned by some government agency. That government agency is not necessarily associated with the country in which the earth station is located. The microwave signal is then downlinked to another large microwave dish 24 at television station 28 where it can be broadcast live to a surrounding area or taped for broadcast at a later time. Alternatively, local television station 28 can retransmit the video clip from dish 24 to another television station 29 having its own dish 30 with a diameter of about 8–12 feet. A local television station can then rebroadcast the video clip to its local viewers using dish 30.

This process has a variety of drawbacks. For example, earth station 14 is very large, heavy and has expensive uplink electronics. Also, earth station 14 can weigh several tons and consequently shipping such a system itself can become very expensive. Truck 10 with uplink electronics and large dish 16 can require 6 to 8 men to assemble and operate. In addition, earth station 14 can cost several hundred thousand dollars to own, or tens of thousands of dollars to rent on a per day basis. Also, in order to operate earth station 14, the news team must obtain a license from the country in which the earth station 14 is located. First, since earth station 14 must be shipped to the local country, it also has to pass through that country's local customs office.

Even after all of the above drawbacks are overcome, the news team cannot send the video clip from earth station 14 to television station 28 until several more steps have been performed. First, earth station 14 must contact the appropriate government agency which operates satellite 20 and prebook a specific time period during which the video clip will be transmitted from earth station 14 to television station 28. In addition, earth station 14 and television station 28 both must know and use the protocol required by the particular agency or government which controls satellite 20. Moreover, since the time of transmission via satellite 20 must be prebooked, the uplink will fail if the news team does not have the taped news clip ready. Also, despite its size and complexity, earth station 14 does not typically contain equipment capable of editing the video clip before it is transmitted to television station 28 via satellite 20.

The above scenario can be described as a "best case" scenario since it was assumed that the television station has its own satellite dish 24 and can rent or own an earth station 14. This situation becomes even more complicated and nearly impossible if, for example, television station 28 has to rely on transmitting the video clip out of the country even using that country's government satellite earth station as shown FIG. 1B. In particular, FIG. 1B shows a government satellite earth station 40 with a large C or Ku dish 44 which uplinks C or Ku microwaves to satellite 20 which in turn downlinks these microwave signals to television station 28. In this scenario, transmission from earth station 40 must be prebooked with the local government in addition to prebooking a transmission time slot with the government or agency which operates satellite 20. (These two governments are likely not the same.) Moreover, since the local government operates earth station 40, it can censor all such news clips and allow only those news clips or sections of news clips to be transmitted with which the government agrees. Furthermore, many countries will not have such a satellite earth station. Consequently, those television stations which do not have access to an earth station similar to earth station 14 in FIG. 1A must hand carry or mail the video clip to television station 28 or to another country which does have an earth station 14. Hence, by the time the video clip arrives at television station 28, the news it contains is old.

In addition to the above difficulties associated with uplinking a microwave signal to satellite 20, downlinking from satellite 20 to earth station 28 may involve one or more hops as shown in FIG. 1C. In particular, FIG. 1C shows microwave signals uplinked form either earth station 14 or governmental earth station 40 to satellite 20 which in turn must be downlinked (due to the location of satellite 20) to a first earth station 50 located, for example, in Europe. First earth station 50 must in turn uplink to a second satellite 20' which in turn downlinks to earth station 28. During this process, the protocol of each link must be complied with. This creates an even greater burden on the news team.

Teleconferencing technology like news gathering and broadcasting technology involves transmitting video signals from one location to another. However, teleconferencing differs from news gathering in that news gathering typically involves transmitting high quality video images from a first location and receiving that information at a second location, whereas teleconferencing involves both transmitting and receiving video images at each of the first and second locations albeit not necessarily video images of broadcast quality.

FIG. 2 shows a first building 200 and a second building 240 interconnected via a high speed digital data network 250 such as (ACUNET) or integrated services digital network (ISDN). These networks are capable of transmitting digital information at rates of 64 kilobits/second (kbps) or in some cases 128 kbps. Network 250 must include a signal routing center 260 (typically owned and operated by a telephone company) and data lines 264 and 268 interconnecting teleconferencing equipment 274 in building 200 to teleconferencing equipment 278 in building 240. Signal routing system 260 can include a variety of satellite, fiber optic and standard hardwired links.

Teleconferencing equipment 274 and 278 must be capable of transmitting and receiving audio/video signals in real time. In order to do this, data lines 264 and 268 must be capable of transmitting more than the standard telephone line audio bandwidth of 9.6 kbps. Consequently, standard telephone lines cannot be used to interconnect teleconferencing equipment 274 to teleconferencing equipment 278.

ACUNET or ISDN interconnecting can transmit at high enough bit rates to enable interconnection of teleconferencing equipment. However, high speed digital (HSD) lines or ISDN lines have been installed in only a few cities throughout the United States and only in the main business districts of those cities. Moreover, only selected buildings within those main business districts have been hard wired with high speed data lines 264 and 268. Also, installation of such high speed data lines is a long and expensive process.

In addition to the above discussed limitations, vehicle 10 of FIG. 1A cannot be uplinked to satellite 20 while vehicle 10 is in motion. Hence, a television news crew cannot pursue a news event which changes its location without undergoing a time consuming process of taking down dish 16, packing up all of their equipment, driving to the new location, setting up all of the equipment in vehicle 10 and satellite dish 16 and obtaining the satellite up-and down links as discussed above. Note also that after taking down satellite dish 16, all equipment in vehicle 10 must be secured before that vehicle can be driven to a new location. Otherwise, any rough terrain encountered en route to the next location could result in serious damage to the components in station 14. By the end of such a long process, the news event may have already moved to yet another location. Consequently, station 14 cannot be used to cover outdoor based events of an emergency nature.

In addition to the above, communications sent via dish 16 to satellite 20 can be received by other satellite dishes in the general region of station 14. Hence, communications between station 14 and television station 28 are not secure. Also, stations such as station 14 do not include the capability of editing video information on site before transmitting that information back to television station 28 and do not provide any type of bullet proof shielding.

The above discussed prolonged set up and take down times also severely limit the applicability of system 14 as an emergency medical vehicle. For example, if there is an accident at a remote location, it would be desirable to be able to drive vehicle 10 (loaded with medical diagnostic equipment) to that location in order to provide emergency medical assistance. However, the long set up and take down times effectively eliminate the use of such a vehicle in these circumstances.

In addition to transmitting and receiving audio/video information from a moving vehicle, it is sometimes necessary to provide a means for acquiring audio/video information or other information from a location remote from the vehicle itself. For example, if there is a newsworthy event which cannot be reached by car or truck, a news crew may have to go to that scene by foot and transmit audio/video information or other information from the remote location to the vehicle itself.

Similarly, in medical situations, accidents often occur in hard-to-reach places such as near cliffs, ski slopes, hiking trails or out at sea, etc. Moreover, patients at the remote locations may often require immediate medical assistance before being transported to the vehicle containing the medical diagnostic equipment. In this case, since the patient is often in hard to reach locations, it is desirable to be able to reach the patient without transporting diagnostic equipment to the patient. Therefore, it is desirable to be able to maintain most diagnostic equipment inside the vehicle itself so that the paramedic need only carry medical sensors leaving the diagnostic equipment on board the vehicle. The paramedic could then use the sensors to transmit all relevant information to the doctor or doctors in the vehicle and follow instructions from them.

Sometimes patients at such remote sites require expertise which is not available even in the vehicle containing the diagnostic equipment. In these cases, it would be desirable to be able to communicate immediately and in real time to a hospital with specialists in the desired fields. Vehicle 10, however, must as discussed above be set up and transmission times must be prearranged before communications can be established between vehicle 10 and a hospital with a receiving satellite dish 24 and necessary television equipment. Consequently, station 14 simply cannot provide medical services such as those discussed above.

SUMMARY OF THE INVENTION

An object of the invention therefore is to provide a global satellite communications vehicle for transmitting and receiving information while in motion or at rest.

Another object of the invention is to provide a vehicle which can operate in a full duplex mode for teleconferencing while in motion or at rest.

Another object of the invention is to provide a communications system which can transmit and receive medical information while in motion or at rest.

Another object of the invention is to provide a system which can link communications between a paramedic in a remote location and a specialist anywhere in the world.

Another object of the invention is to provide a system which can transmit diagnostic information from the vehicle to a hospital while en route to that hospital.

Another object of the invention is to provide a communications system which can be set up quickly and easily.

Another object of the invention is to provide a system which includes equipment for editing video clips.

Another object of the invention is to provide a communications system which can transmit audio/video information on an ad hoc, event-by-event basis.

An advantage of the system is that it can transmit audio/video information while in motion.

Another advantage of the system is that it can transmit and receive high quality audio/video information in real time.

Another advantage of the system is that it can be used to cover outdoor events in emergency situations.

Another advantage of the system is that it has one or more microwave communication links which provide communications between the vehicle and an individual at a remote location.

Another advantage of the invention is that it provides secure communications.

Another advantage of the system is that it provides position, speed and altitude of the vehicle.

Another advantage of the invention is that it provides transmission and reception of audio/video information on a dial-up basis.

Another advantage of the system is that it is capable of withstanding several G's of shock while moving and still operate properly.

Another advantage of the invention is that it accepts scrambling devices.

Another advantage of the invention is that it does not utilize a satellite dish or "dome" visible on the rooftop of the vehicle, but instead, the vehicle appears like an ordinary recreational vehicle from the outside.

One feature of the invention is that it utilizes a receive signal processor.

Another feature of the invention is that it utilizes a vehicle with physical storage capacity such as a truck or a van.

Another feature of the invention is that it utilizes relatively small antennas.

Another feature of the invention is that it utilizes remote extension packs capable of transmitting and receiving video and sound via one or more microwave links.

Another feature of the invention is that it utilizes digital communications and hence the communications are difficult to intercept.

Another feature of the invention is that it can use any type of communication link between the system and a remote location, such as an infrared or optical link.

Another feature of the invention is that it utilizes a standard A antenna terminal and antenna.

Another feature of the invention is that it utilizes a standard M terminal and antenna array.

Another feature of the invention is that it can utilize a standard B-type terminal and antenna.

Another feature of the invention is that it utilizes a global position system (gps) receiver and antenna.

Another feature of the invention is that it is powered by a power generator which is mounted in the vehicle.

Another feature of the invention is that it utilizes a standard C system to transmit gps derived information to any Inmarsat C equipped transmitter/receiver in the world.

Another feature of the invention is that it can have bullet proof panels.

These and other objects advantages and features accomplished by the provision of a mobile microwave system., including: a power generator; a microwave subsystem coupled to the power generator for transmitting first local microwave signals modulated with first local digital data while in motion with respect to earth and for receiving first remote microwave signals modulated with first remote digital data while in motion with respect to earth; a high speed digital station coupled to the power generator and the microwave subsystem, for receiving a video signal and for transforming and compressing the video signal into the first local digital data and for transforming and decompressing the first remote digital data into a first decompressed remote digital data; and a vehicle for housing the power generator, the microwave subsystem and the high speed digital station, the vehicle having a lower portion and an upper portion, wherein the first local microwave signals can pass through the upper portion.

The above and other objects, advantages and features are accomplished by the further provision of: gps antenna; and gps receiver coupled to the gps antenna and the high speed digital station, for determining location information of the vehicle and outputting the location information to the high speed digital station, as gps data, as well as the further provision of a standard C antenna; a standard C transmitter and receiver, coupled to at least one of the gps receiver and the high speed digital station for receiving the location information and transmitting the location information to a satellite.

The above objects, advantages and features are also accomplished by the provision of an L band microwave system, comprising: an L band microwave subsystem for transmitting first local microwave signals modulated with first local digital data and for receiving first remote microwave signals modulated with first remote digital data; and a high speed digital station coupled to the L band microwave subsystem, for receiving a video signal and for transforming, editing and compressing the video signal into the first local digital data and for decompressing, editing and transforming the first remote digital data into first decompressed remote digital data.

The above and other objects, advantages and features are accomplished by the further provision of: a gps antenna; and gps receiver coupled to the gps antenna and the high speed digital station, for determining location information of the vehicle and outputting the location information to the high speed digital station, as gps data as well as a standard C antenna; a standard C transmitter and receiver, coupled to at least one of the gps receiver and the high speed digital station for receiving the location information and transmitting the location information to a satellite.

The above and other objects, advantages and features are alternatively accomplished by the provision of an L band microwave system, comprising: a power generator; a standard A subsystem coupled to the power generator, including: an antenna assembly for transmitting A band local microwave signals and for receiving A band remote microwave signals; and a standard A antenna terminal coupled to the standard A antenna assembly for receiving, demodulating and processing the A band remote microwave signals to yield first remote digital signals, and for processing first local digital signals to generate the A band local microwave signals and for controlling the antenna assembly in accordance with gps data; a standard M subsystem coupled to the power generator, including: an array antenna for transmitting M band local microwave signals and for receiving M band remote microwave signals; and a standard M array antenna terminal coupled to the array antenna for receiving, demodulating and processing the M band remote microwave signals to yield second remote digital signals, for processing second local digital signals to generate the M band local microwave signals and for controlling the array antenna in accordance with the gps data; a high speed digital station coupled to the A band subsystem, the standard M subsystem and the power generator, including: signal converter for receiving and converting the first and second remote digital data and outputting first and second asynchronous compressed remote digital data, respectively, and for receiving and converting first and second asynchronous compressed local digital data to yield the first and second local digital data, respectively; receive signal processor for receiving, editing and decompressing the first and second asynchronous compressed remote digital data to yield first and second decompressed remote digital data and for compressing and editing first and second decompressed local digital data to yield the first and second asynchronous compressed local digital data; and video signal receiver and display coupled to the receive signal processor for receiving and displaying at least one of the first and second decompressed remote digital data, and for receiving a video signal and transforming the video signal into the first and second decompressed local digital data and for displaying the video signal; microwave suitcase subsystem, including: microwave transmitter for receiving an external video signal and transmitting a microwave signal modulated with the external video signal; and microwave receiver for receiving and demodulating the microwave signal to yield the video signal; gps subsystem coupled to the power generator, comprising: gps antenna; and gps receiver coupled to the gps antenna and the high speed digital station, for determining location information of the vehicle and outputting the location information to the high speed digital station, as the gps data; a vehicle for housing the power generator, the standard A subsystem, the standard M subsystem, the high speed digital station and the microwave receiver, the vehicle including a lower portion and an upper portion, wherein the upper portion passes L band microwaves; and video camera coupled to the video camera signal receiver via the microwave suitcase subsystem, for outputting the external video signal.

The above and other objects, advantages and features of the present invention will become more apparent from the following description of embodiments thereof taken in conjunction with the accompanying drawings.

BRIEF DESCRIPTION OF THE DRAWINGS

FIGS. 1A–1C show a truck with a satellite dish which together serve as a point-of-origin independent work station and that how that work station relies on a host country's government satellite earth station.

DETAILED DESCRIPTION OF THE PREFERRED EMBODIMENTS

Figure 1A:
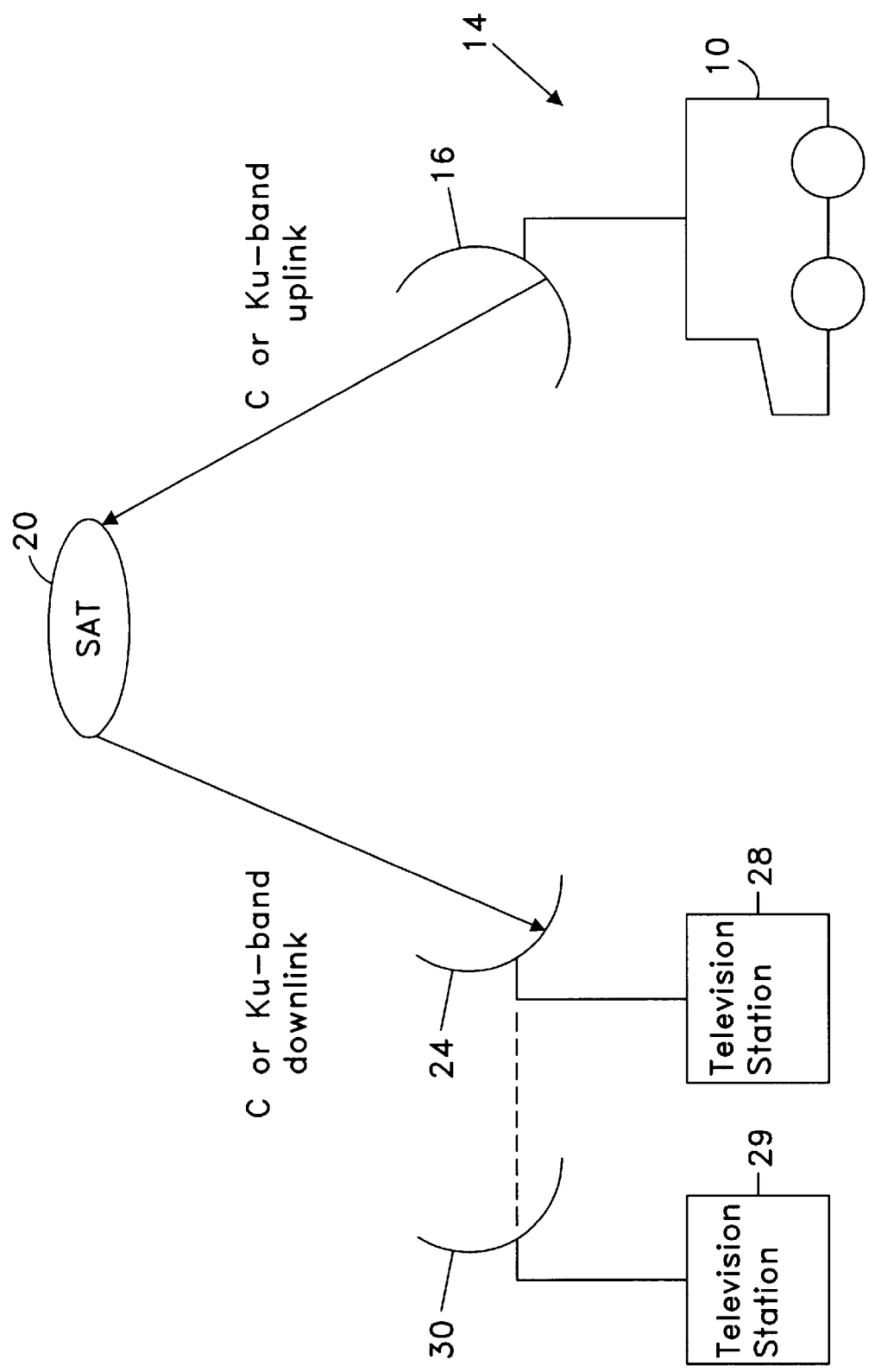
Figure 2:
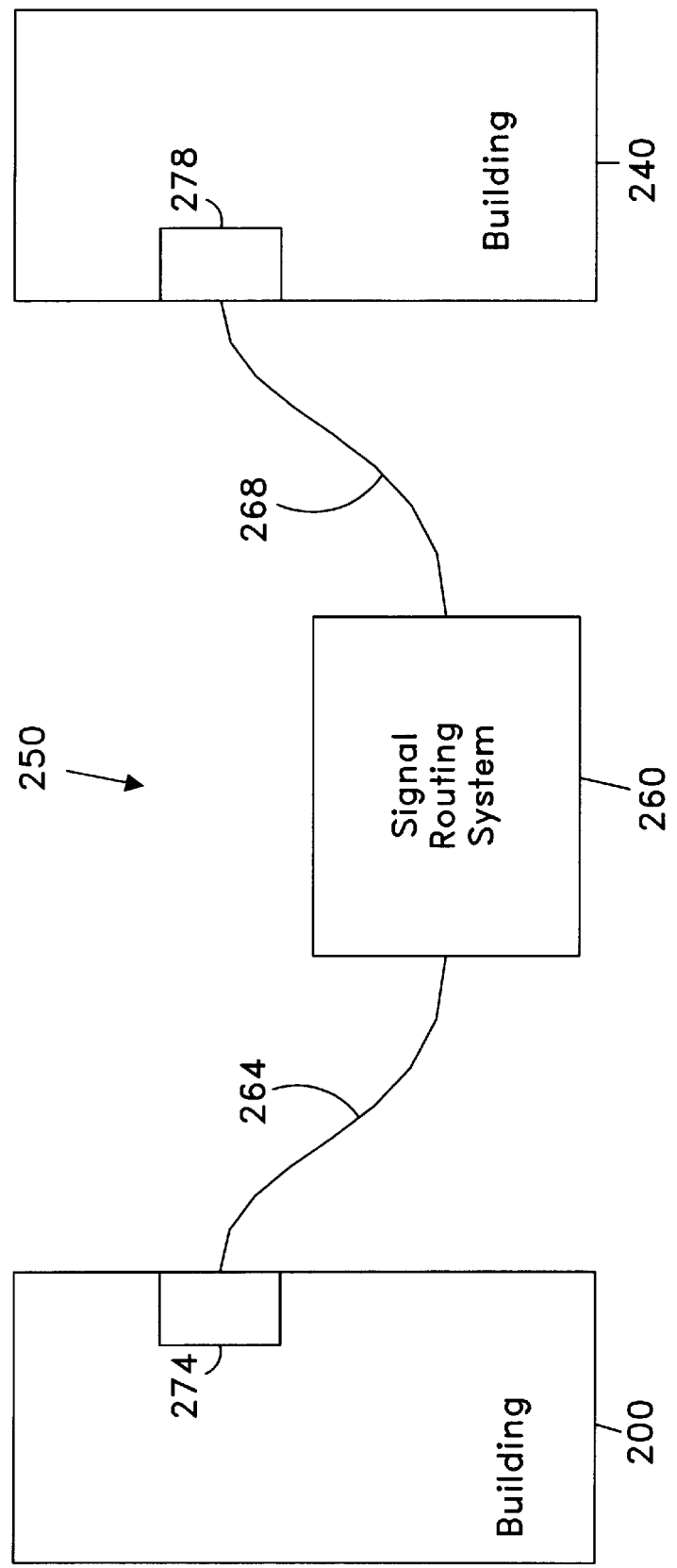
FIG. 2 shows a first building and a second building interconnected via a high speed digital data network such as (ACUNET) or integrated services digital network (ISDN).
Figure 3A:
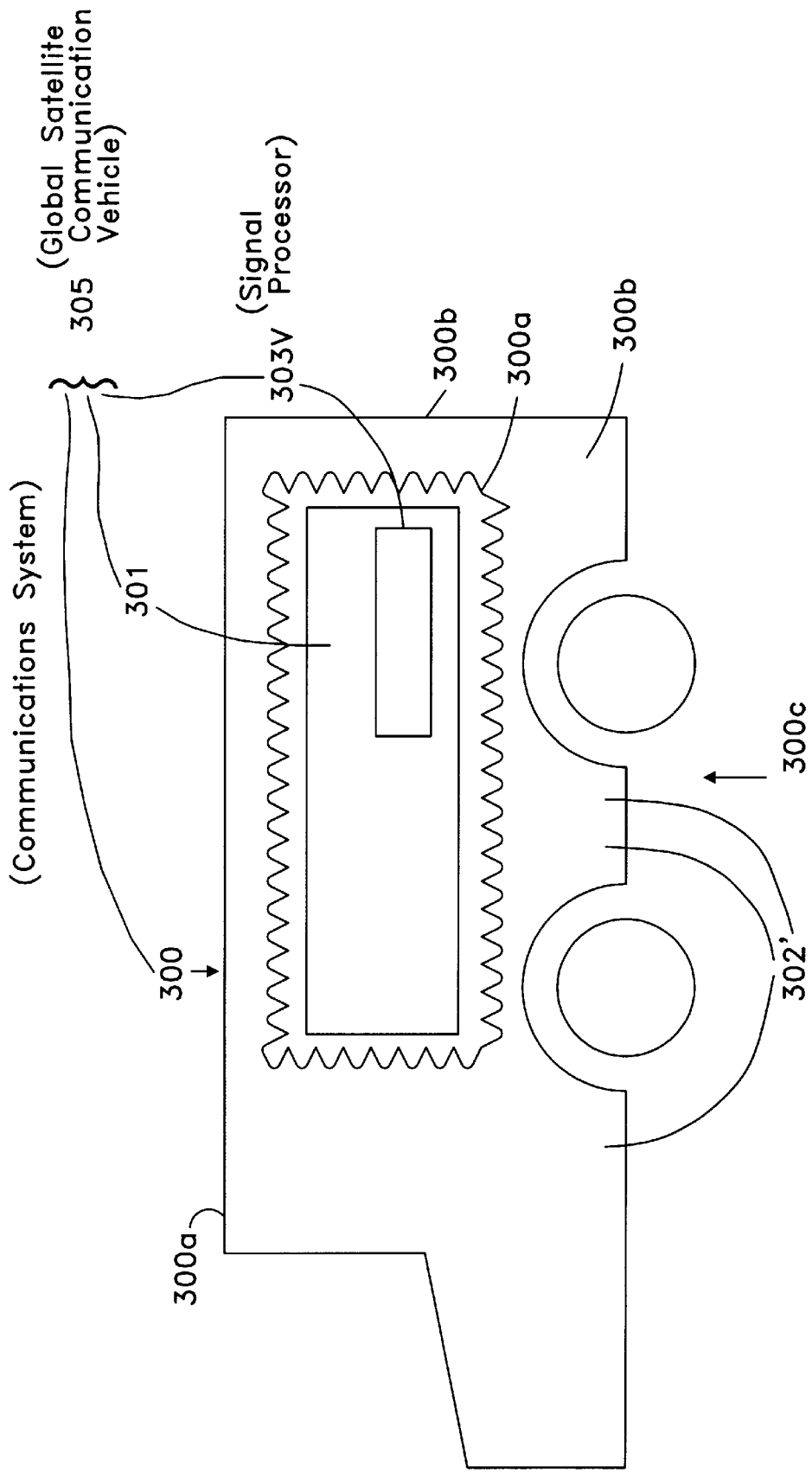
FIG. 3A shows a vehicle with a communications system which includes a signal processor.

FIG. 3A shows a vehicle 300 with a communications system 301 which includes signal processor 303V according to one embodiment of the invention. Top portion 300a of vehicle 300 is built of fiber glass or other material that passes microwaves whereas bottom portion 300b need not. Alternatively, top portion can be made to open thereby allowing microwave transmission from vehicle 300. Vehicle 300 can have bullet proof panels 302' built into sides 300c.

Vehicle 300, communications system 301 and signal processor 303V make up global satellite communications vehicle 305. Communications system 301 is visible here only because vehicle 300 has been cut open in FIG. 3A. Typically, however, communications system 301 will not be visible from outside of vehicle 300.

Figure 3B:
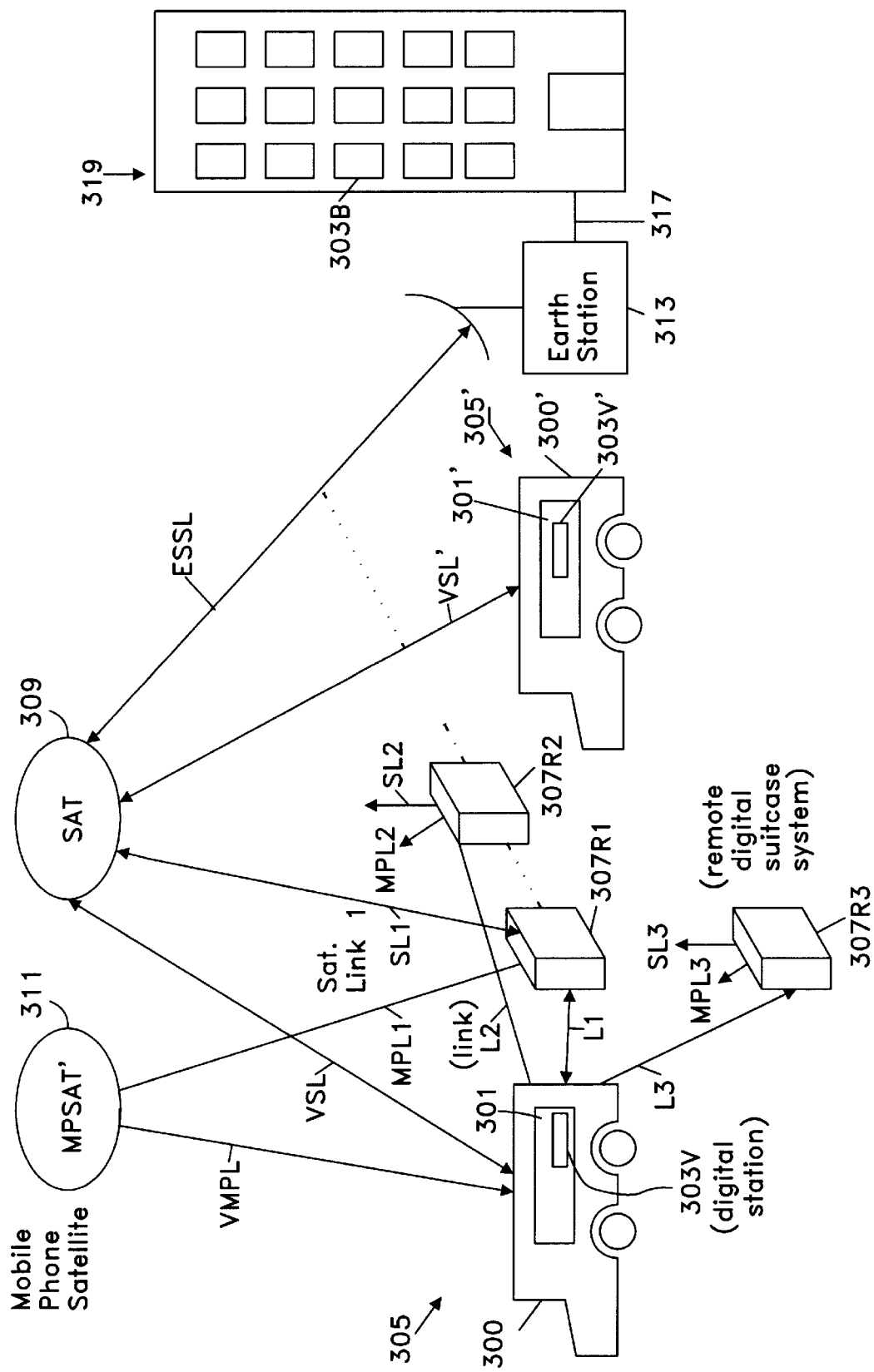
FIG. 3B shows the global satellite communications vehicle together with remote digital suitcase systems according to one embodiment of the invention and FIG. 3C shows remote digital suitcase system with an open microwave umbrella dish.

FIG. 3B shows global satellite communications vehicle 305 together with remote digital suitcase systems 307R1, 307R2 and 307R3. Each remote digital suitcase system is capable of communicating with communications system 301 on vehicle 300 via links L1, L2 or L3. In addition, remote digital suitcase systems 307R1, 307R2 and 307R3 can communicate directly with satellite 309 via satellite link 1 (SL1), satellite link 2 (SL2) and satellite link 3 (SL3), respectively. Remote digital suitcase systems 307R1–307R3 can further communicate via multiple phone links (MPL1–MPL3), respectively, with mobile phone satellite (MPSAT') 311. Communications system 301 has a vehicle satellite link (VSL) with satellite 309 as well as a vehicle mobile phone link (VMPL) with mobile phone satellite 311.

Communications between remote digital suitcase 307R1 can be achieved in one or more of the following manners. Communications system 301 can transmit and receive via link VSL to satellite 309 and then via satellite link 1 to remote digital suitcase system 307R1. Alternatively, communications system 301 can transmit and receive information via vehicle mobile phone link VMPL to mobile phone satellite 311 and then to and from remote digital suitcase system 307R1 via mobile phone link 1 (MPL1). Communications system 301 can also transmit and receive via links L1–L3 to or from remote digital suitcase systems 307R1–307R3, respectively.

Links L1–L3 can be wide band microwave links or wide band optical links. Hence, links L1–L3 can transmit and receive high quality broadcast audio/video information. Satellite links SL1–SL3 and VSL can be L band satellite communication links. Consequently, high quality (broadcast quality) audio/video information as well as any other type of information can be transmitted to and from communications system 301 as well as remote digital suitcase systems 307R1–307R3. The remaining mobile phone links, i.e., MPL1–MPL3 as well as VMPL are narrower bandwidth lengths which can transmit and receive audio information.

FIG. 3B also shows a second global satellite communications vehicle 305' with a vehicle 300', communications system 301' and digital stations 303V' corresponding to those of vehicle 305. Second global satellite communications vehicle 305' has a second vehicle satellite link (VSL') which provides a communications link with satellite 309. Hence, global satellite communications vehicle 305 can communicate with second global satellite communications vehicle 305' via satellite links VSL and VSL', and vice versa. In addition, remote digital suitcase systems 307R1–307R3 can communicate with second global satellite communications vehicle 305' via satellite links SL1–SL3, respectively, and satellite link VSL' without ever transmitting to global satellite communications vehicle 305.

Global satellite communications vehicle 305 as well as remote digital suitcase systems 307R1–307R3 can also communicate with similarly equipped vehicles or an earth station 313 via an earth station satellite link (ESSL). Earth station 313 can further have a digital high speed data (DHSD) link 317 to a building 319 which has a signal processor 303B or a high speed digital station (such as digital station 510 to be discussed below) via DHSD link 317. Consequently, high quality audio/video information can be transmitted between communications system 301 and: 1) remote digital suitcase systems 307R1–307R3; 2)

second global satellite communications vehicle 305'; 3) earth station 313; and 4) signal processor 303B. Similarly, remote digital suitcase systems 307R1–307R3 can communicate with: 1) each other; 2) second global satellite communications vehicle 305'; 3) earth station 313; and 4) signal processor 303B.

Figure 3C:
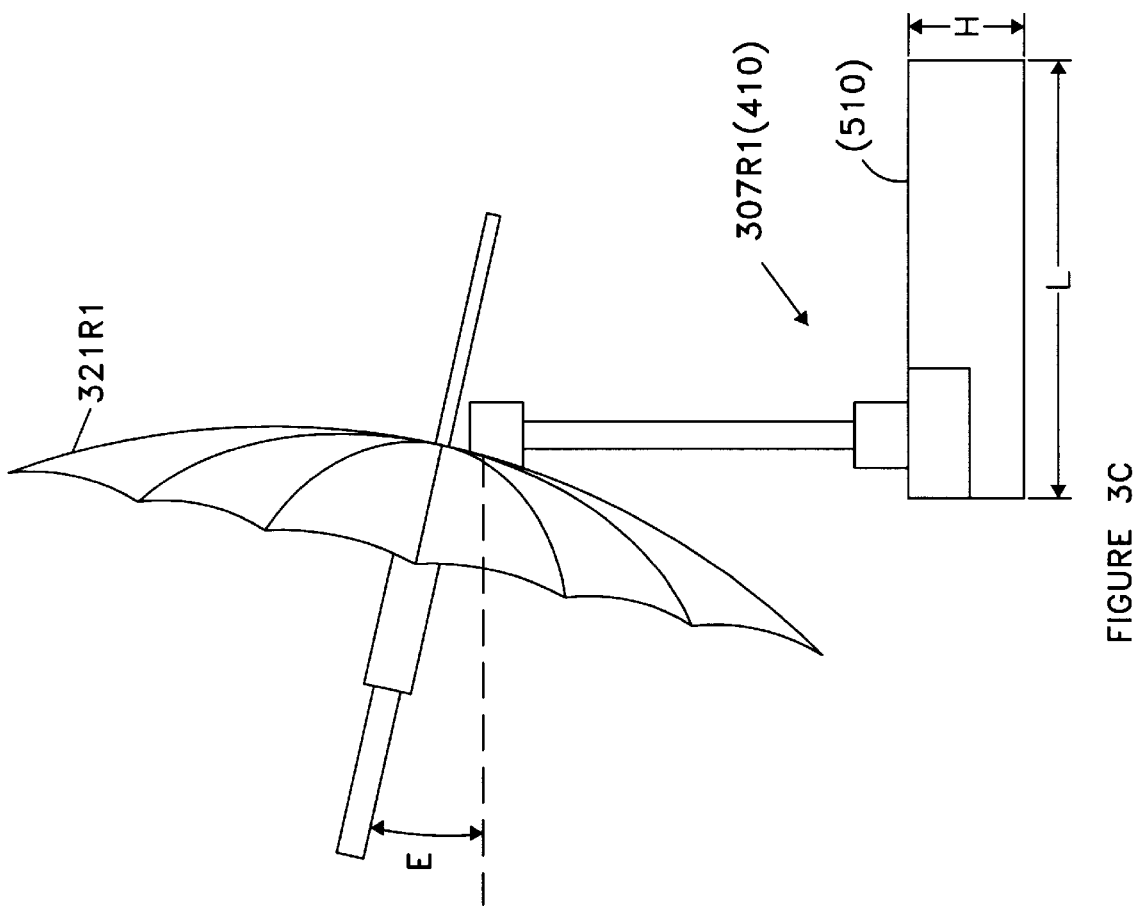

FIG. 3C shows remote digital suitcase system 307R1 with a microwave umbrella dish 321R1 open. Umbrella dish 321R1 is shown slanted at an angle E and ready to transmit and/or receive microwave signals. Here, 307R1 corresponds to transmission system 410 of U.S. patent application Ser. No. 08/047,089. The portion of remote digital suitcase system 307R1 which does not include umbrella system 321R1 is the same as digital station 303V in FIG. 3B and corresponds to high speed data line receiving system 510 of the same U.S. patent application.

Figure 4A:
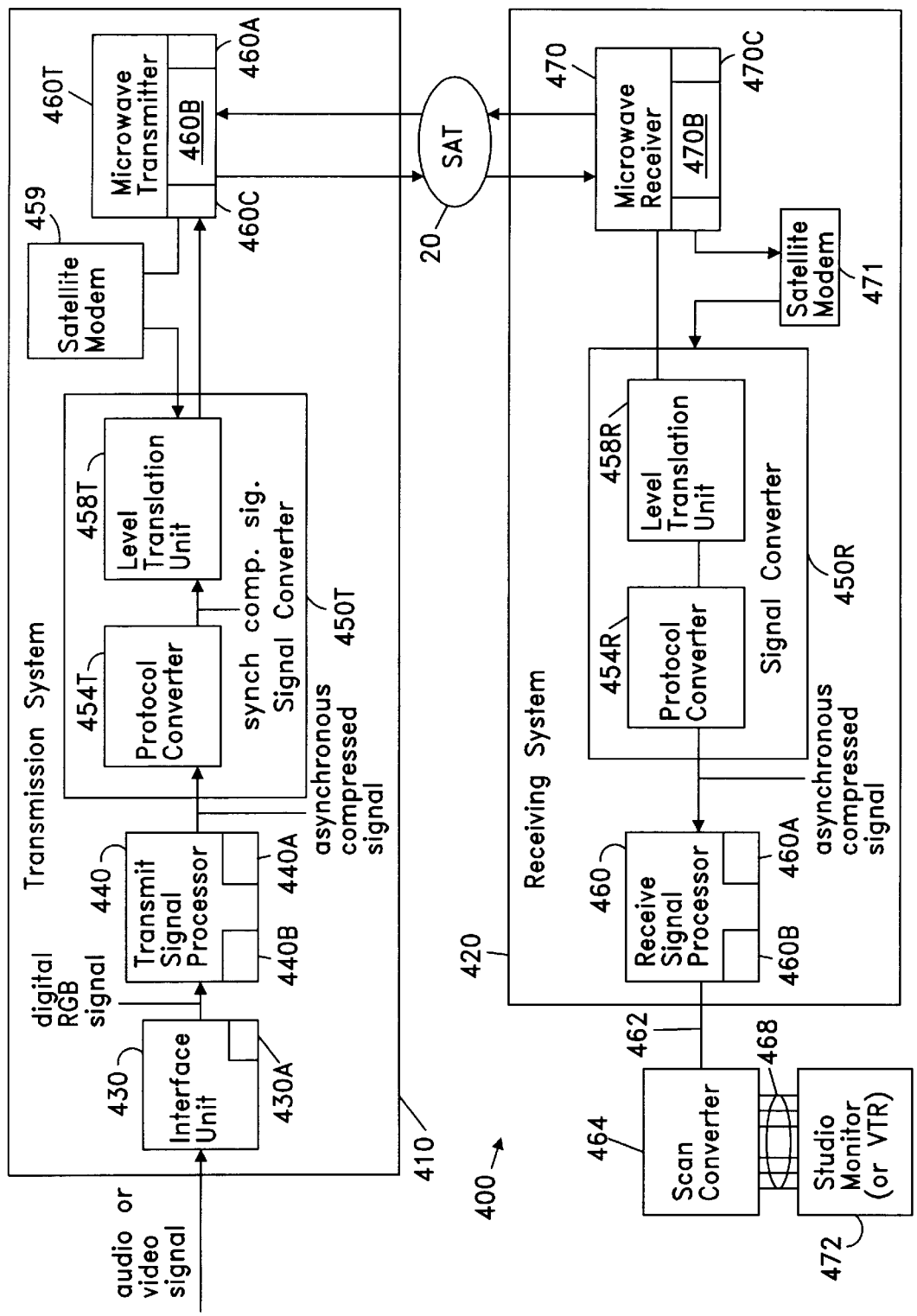
FIGS. 4A and 4B show a more detailed block diagram of a transmission and receiving system.
Figure 4B:
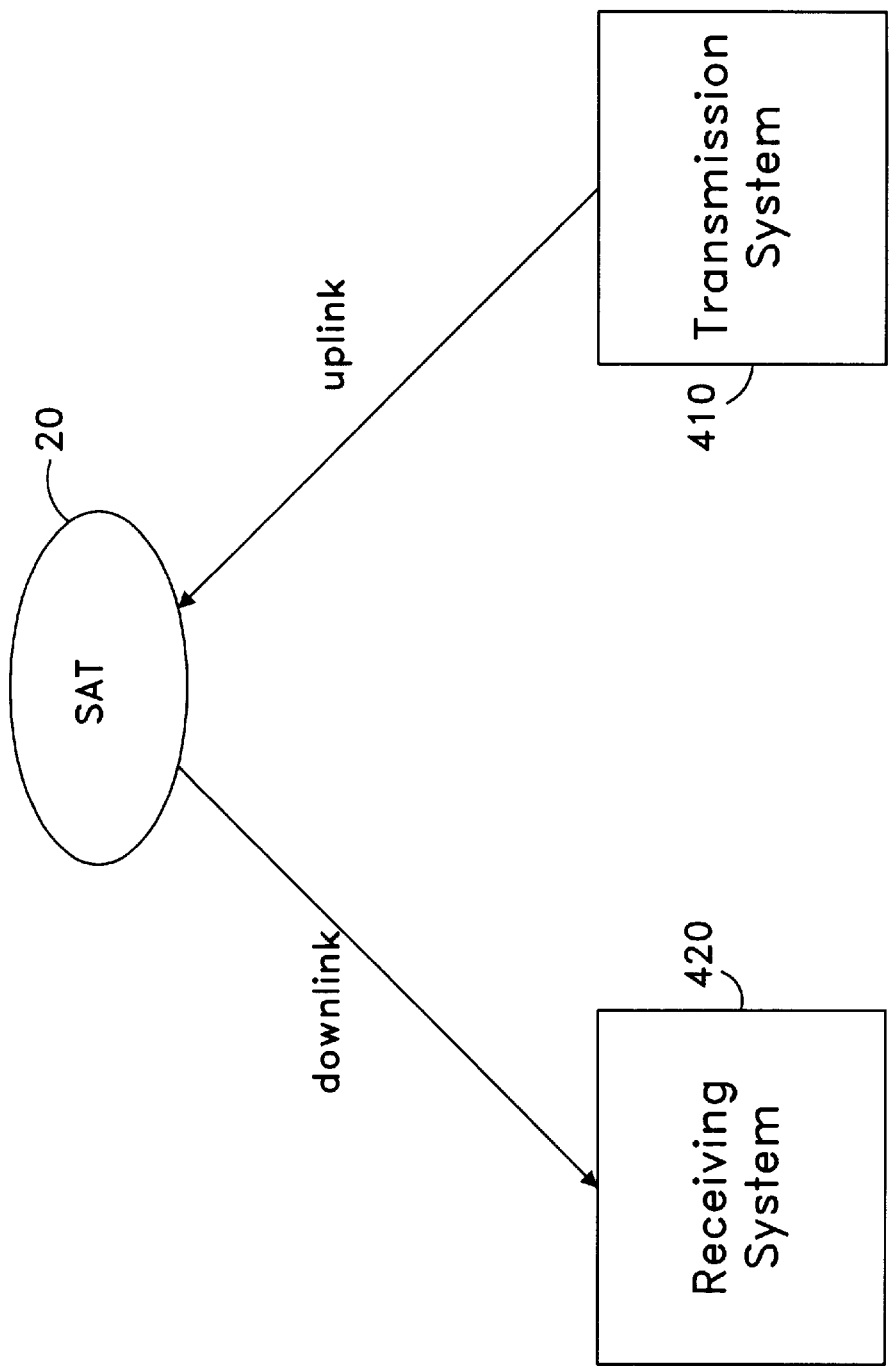

FIGS. 4A and 4B show a more detailed block diagram of a transmission and receiving system 400 which can serve as suitcase system 307R1 operating in a transmission and receiving mode, respectively. In particular, FIGS. 4A and 4B show a transmission system 410 at a first location which communicates with a receiving system 420 at a second location via satellite 20. Throughout this discussion, embodiments of the invention will be described with respect to transmitting audio/video information, it being understood that the invention will transmit any type of analog or digital information such as digital data files, sensor signals (analog or digital), etc.

Transmission system 410 includes an interface unit 430 which receives an analog audio signal and an analog video signal which will be referred to here as an analog audio/video signal and transforms that analog audio/video signal into a digital red, green, blue (RGB) signal. The audio/video signal can come from a camera or a video tape recorder (VTR) neither of which is shown in the Figure. Interface unit 430 demodulates the audio/video signal which is either an NTSC, PAL, or SECAM signal and outputs the digital RGB signal. The digital RGB signal output from interface unit 430 is then received by a transmit signal processor 440 which compresses the digital RGB signal into an asynchronous compressed signal and stores that asynchronous compressed signal on a hard disk (or optical disk) 440A. Transmit signal processor 440 can then output the asynchronous compressed signal at high speeds using a high speed modem (not shown). The asynchronous compressed signal is in turn received by a signal converter 450T which includes a protocol converter 454T and a level translation unit 458T. Protocol converter 454T receives the asynchronous compressed signal and converts that signal to a synchronous compressed signal. The synchronous compressed signal is then input to level translation unit 458T which swaps wires and translates the synchronous compressed signal voltage levels into a level translated synchronous compressed signal which is received by a microwave transmitter 460T. Microwave transmitter 460T includes a modulator which modulates the synchronous compressed signal onto a modulated L-band microwave signal. Microwave transmitter 460 then transmits the modulated L-band microwave signal to satellite 20 (which can include one or more earth stations) which receives the L-band microwave signal and transmits that signal to receiving system 420. In particular, microwave transmitter 460T includes an L-band microwave generator 460A, a satellite dish 460B and a microwave modulator 460C. Satellite modem 459 monitors the transmission of the modulated microwave signal from microwave transmitter 460T to receiving system 420. In particular, satellite modem 459 performs handshaking with receiving system 420 at the beginning of transmission and continues to monitor the transmission to determine whether receiving system 420 is being sent the correct signal.

Receiving system 420 includes a microwave receiver 470 which receives the modulated microwave signal and demodulates that signal. Satellite modem 471 performs handshaking with transmission system 410 in a manner similar to satellite modem 459. Microwave receiver 470 includes a microwave demodulator 470C and a microwave dish 470B. A receive signal converter 450R which includes a level translation unit 458R and a protocol converter 454R is similar to signal converter 450T with corresponding level translation unit 458T and protocol converter 454T, respectively. Signal converter 450R operates like signal converter 450T used in the reverse direction. Namely, level translation unit 458R receives a level translated demodulated signal and translates the level of that signal back down to a synchronous (RS-232) signal which can be received by protocol converter 454R and converted to an asynchronous compressed signal. This asynchronous compressed signal is then received by receive signal processor 461 which decompresses it and stores it on a hard disk 461A. If the decompression of asynchronous compressed signal received by receive signal processor 461 is the inverse of the compression which the digital RGB signal underwent in transmit signal processor 440, receive signal processor 461 outputs that same digital RBG signal. Consequently, the digital signal at the first location is available at the second location. A scan converter 464 can receive this digital signal and drive a studio monitor 472 via bus 468.

Figure 4C:
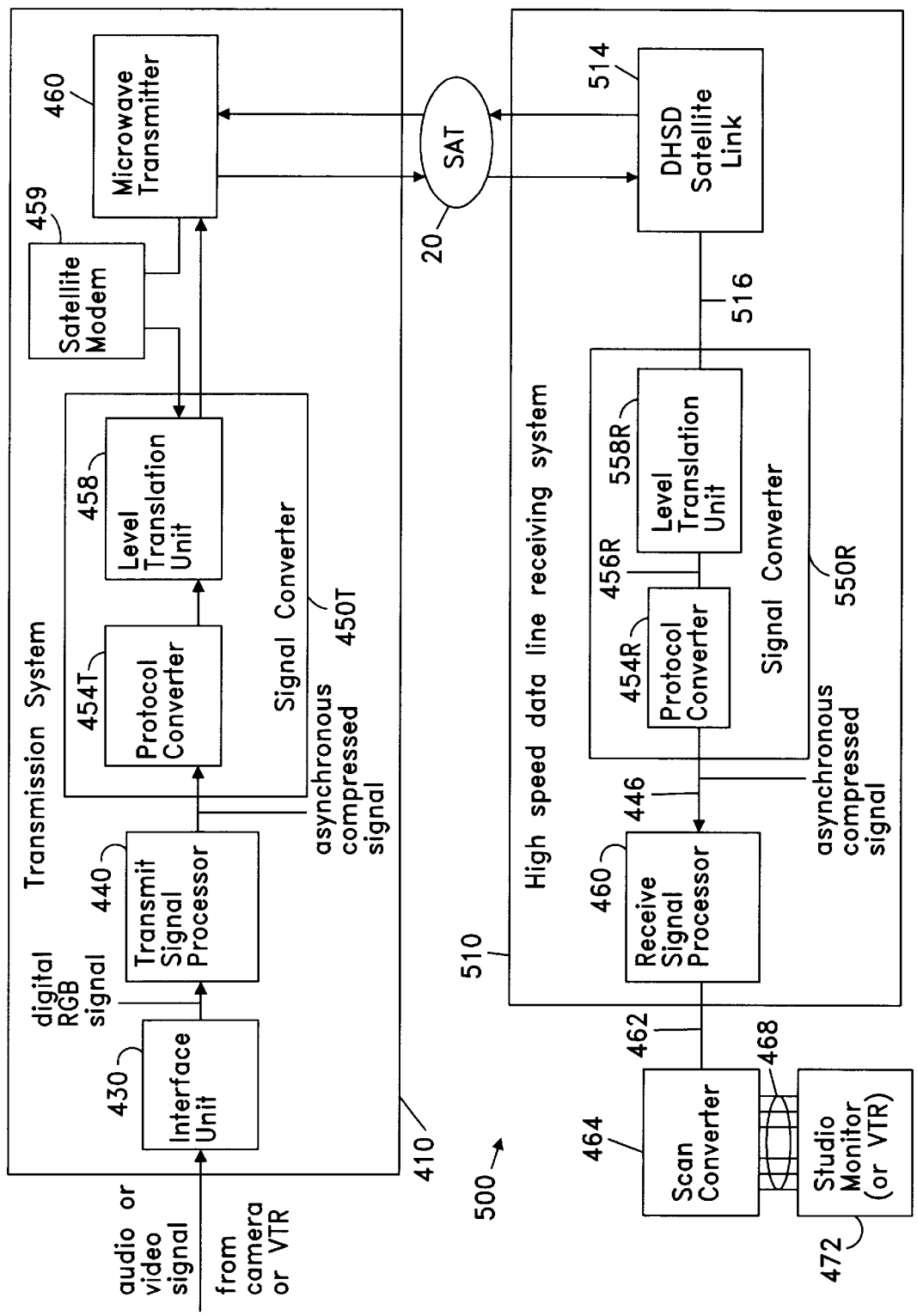
FIGS. 4C and 4D show a transmission and digital receiving system which represents the satellite link between the suitcase and digital station 303B of FIG. 3B.
Figure 4D:
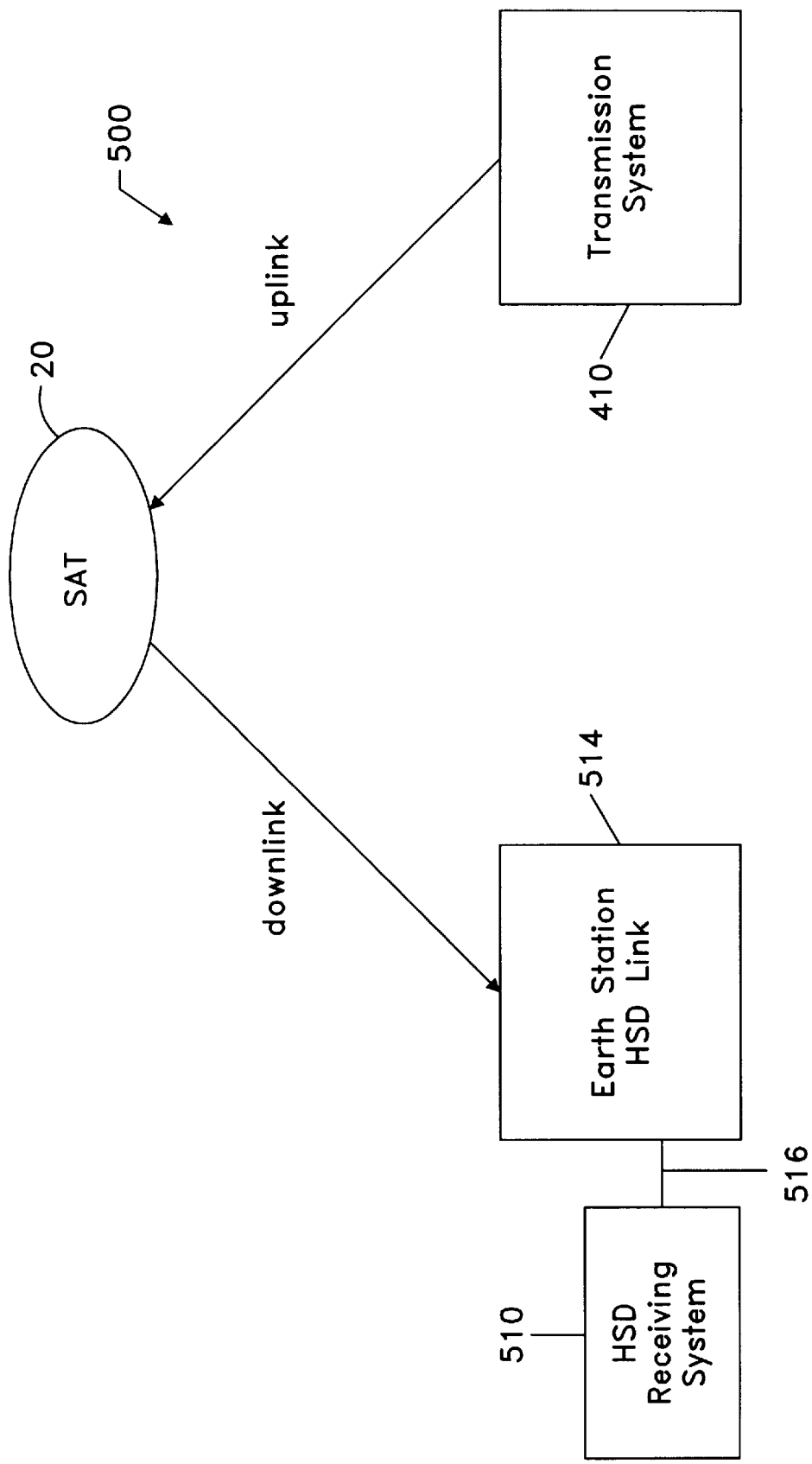

FIGS. 4C and 4D show a transmission and digital receiving system 500 to represent the satellite link between suitcase 307R1 and digital station 303B of FIG. 3B. Here, transmission system 410 is coupled via satellite 20 to a high speed digital station 510. High speed digital station 510 could also serve as any one of suitcases 307R1–307R3 or digital station 303B of FIG. 3B—in which case, satellite SL1–SL3 would not be possible and instead, suitcases 307R1–307R3 would communicate with vehicle 305 via microwave links L1–L3, respectively.

Referring to FIGS. 4C and 4D, elements in system 500 which are also used in transmission and receiving system 400 will be given the same reference numerals. Transmission system 410 is identical to system 410 in system 400 of FIG. 4A. However, instead of receiving microwave signals from satellite 20 via microwave receiver 470 as in FIG. 4A, a digital receiving system 510 receives digital data from a digital high speed data line (DHSD) link 514 available from a phone company. Receiving system 510 includes a signal converter 550R followed by receive signal processor 460. Signal converter 550R includes level translation unit 558R followed by protocol converter 454R.

The microwave signal modulated with compressed digital data is received by a satellite dish (here considered to be part of DHSD link 514) and in turn demodulated to yield a demodulated high speed digital (HSD) signal on DHSD line 516. DHSD link 514 includes satellite, fiber optic and hard wire links. Signal converter 550R receives the digital signal at level translation unit 558R which translates its voltage level for transmission on serial line 456R as a synchronous compressed signal. Protocol converter 454R receives and transforms the synchronous compressed signal into an asynchronous, compressed signal for transmission on bus 446. Receive signal processor 460 in turn receives and decompresses the asynchronous, compressed signal into a digital RGB signal ready to be received and converted by scan converter 464 for display via bus 468 on monitor (or VTR) 472.

Figure 5:
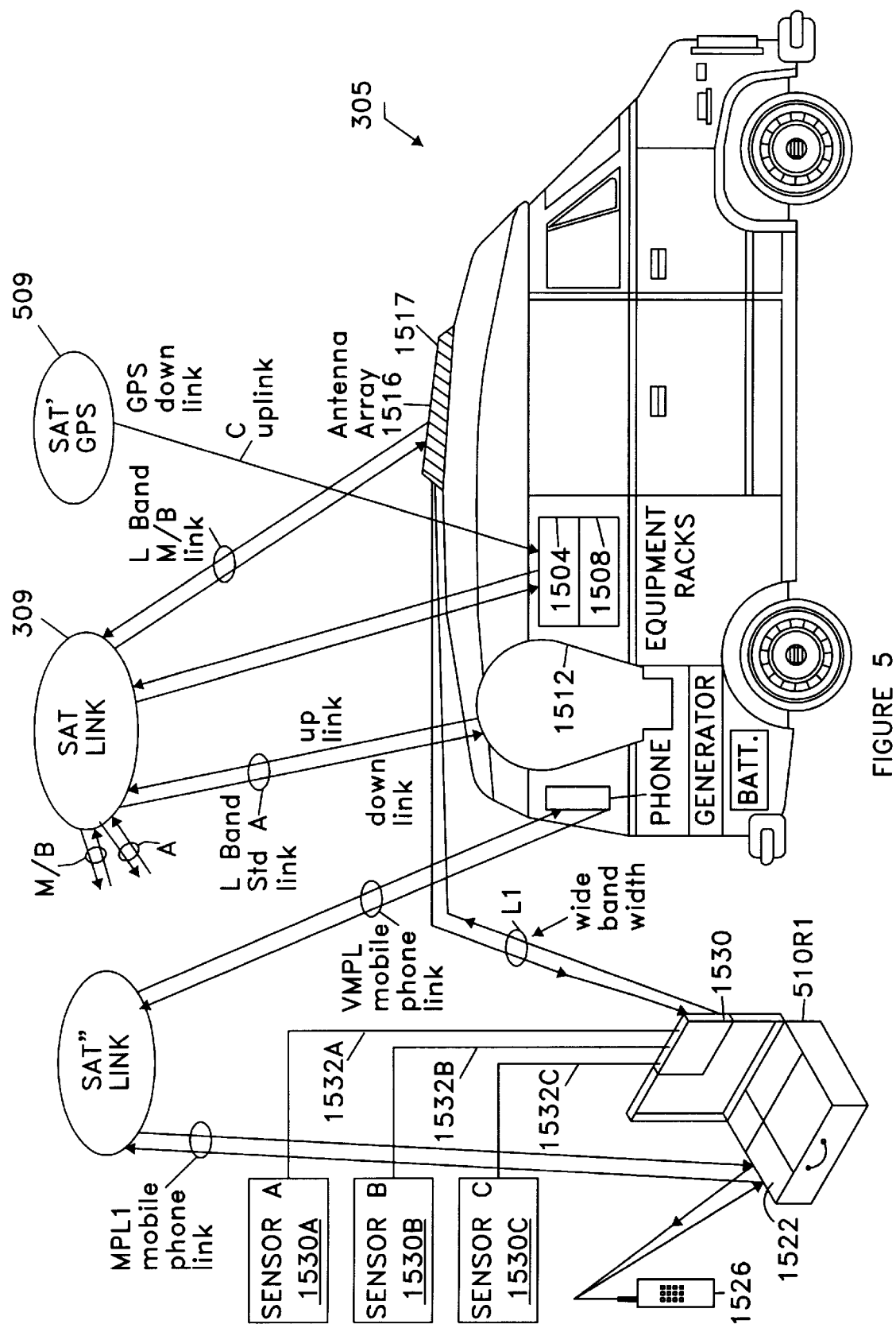
FIG. 5 shows a somewhat more detailed diagram of the global satellite communication vehicle.

FIG. 5 shows a somewhat more detailed diagram of global satellite communication vehicle 305. Here, however, transportable suitcase 51OR1 corresponds to 510 in FIGS. 3C and 4C. That is, transportable suitcase 510R1 corresponds to remote digital suitcase system 307R1 (FIG. 3B) without umbrella dish 321R1 (FIG. 3C). As can be seen, mobile phone link (MPL1) as well as vehicle mobile phone link (VMPL) are as in FIG. 3B. However, vehicle satellite links (VSL) shown in FIG. 3B are actually of two kinds, namely, an L-band standard A satellite link, as well as an L-band standard M or B satellite link. In addition, a global position system (gps) link is shown to a global position system (gps) satellite 509.

Global satellite communications vehicle includes an antenna system 1504 including a gps antenna 1504a and an Inmarsat C antenna 1504b and a transmitter/receiver 1508 which includes a passive gps receiver 1508a and an Inmarsat C transmitter/receiver 1508b. The Inmarsat C transmitter/receiver 1508b can transmit all gps derived vehicle co-ordinates to headquarters or any other Inmarsat C receive capable site. Hence, gps receiver 1508a determines gps vehicle co-ordinates and since the Inmarsat C transmitter/receiver 1508b can in turn transmit this gps information, the combination of gps receiver 1508a and Inmarsat C transmitter/receiver 1508b will be referred to as transmitter/receiver 1508.

Communications vehicle 305 also has a tracking dish 1512 which transmits and receives information to and from satellite 309 using standard A communications. In addition, an antenna array 1516 transmits and receives information to and from satellite 309 via a standard M link or a standard B link (once it becomes available). This and other equipment will be discussed in more detail below. First, however, transportable suitcase 51OR1 will be discussed in more detail.

Transportable suitcase 501R1 includes a cordless phone receiver 1522 as well as a cordless phone 1526. This enables a person operating transportable suitcase 510R1 to communicate with global satellite communications vehicle 305 without having to remain in the close proximity of transportable suitcase 510R1. FIG. 5 further shows a transmitter/receiver 1530 which communicates with an antenna 1517 via link L1. Transmitter/receiver 1530 can be, for example, a microwave transmitter/receiver and L1 can be a wide band microwave link or even an optical link. Transmitter/receiver 1530 is coupled to a plurality of sensors such as sensor A 1530A, sensor B 1530B and sensor C 1530C which are electrically coupled via 1532A, 1532B and 1532C, respectively, to microwave transmitter/receiver 1530. Information acquired by any one of sensors 1530A–1530C is transmitted from transmitter/receiver 1530 to antenna 1517. Similarly, information desired to be sent from communications vehicle 305 to transportable suitcase 510R1 is sent from antenna array 1516 via link L1 to transmitter/receiver 1530 which in turn outputs the demodulated signal to one of sensors 1530A–1530C.

Sensor 1530A can be a video camera which acquires video information in the location of transportable suitcase 510R1 and sends that information to transmitter/receiver 1530. In this case, transportable suitcase 510R1 includes a digital signal processor 510 as discussed above, the video information acquired by sensor 1530A can be digitized and compressed before it is sent to antenna array 1516 via transmitter/receiver 1530. Other examples of sensors which acquire information at the location of transportable suitcase 510R1 include any sort of medical sensing equipment.

Any one of sensors 1530A–1530C can also operate as information receiving equipment which receives information from communications vehicle 305. For example, sensor 1530C could be a pair of high density liquid crystal display goggles which can be worn by an individual while working at the remote location of transportable suitcase 510R1.

Two types of antennas are shown in FIG. 5. Namely, tracking dish 1512 and antenna array 1516 as discussed above. These two systems utilize information received from transmitter/receiver 1508 (recall that transmitter/receiver 1508 includes a gps receiver as well as an Inmarsat C transmitter/receiver) to ensure tracking with satellite 309 and the interrelationship between various components some shown and some not shown in communications vehicle 305 will be discussed in reference to FIG. 6.

Figure 6:
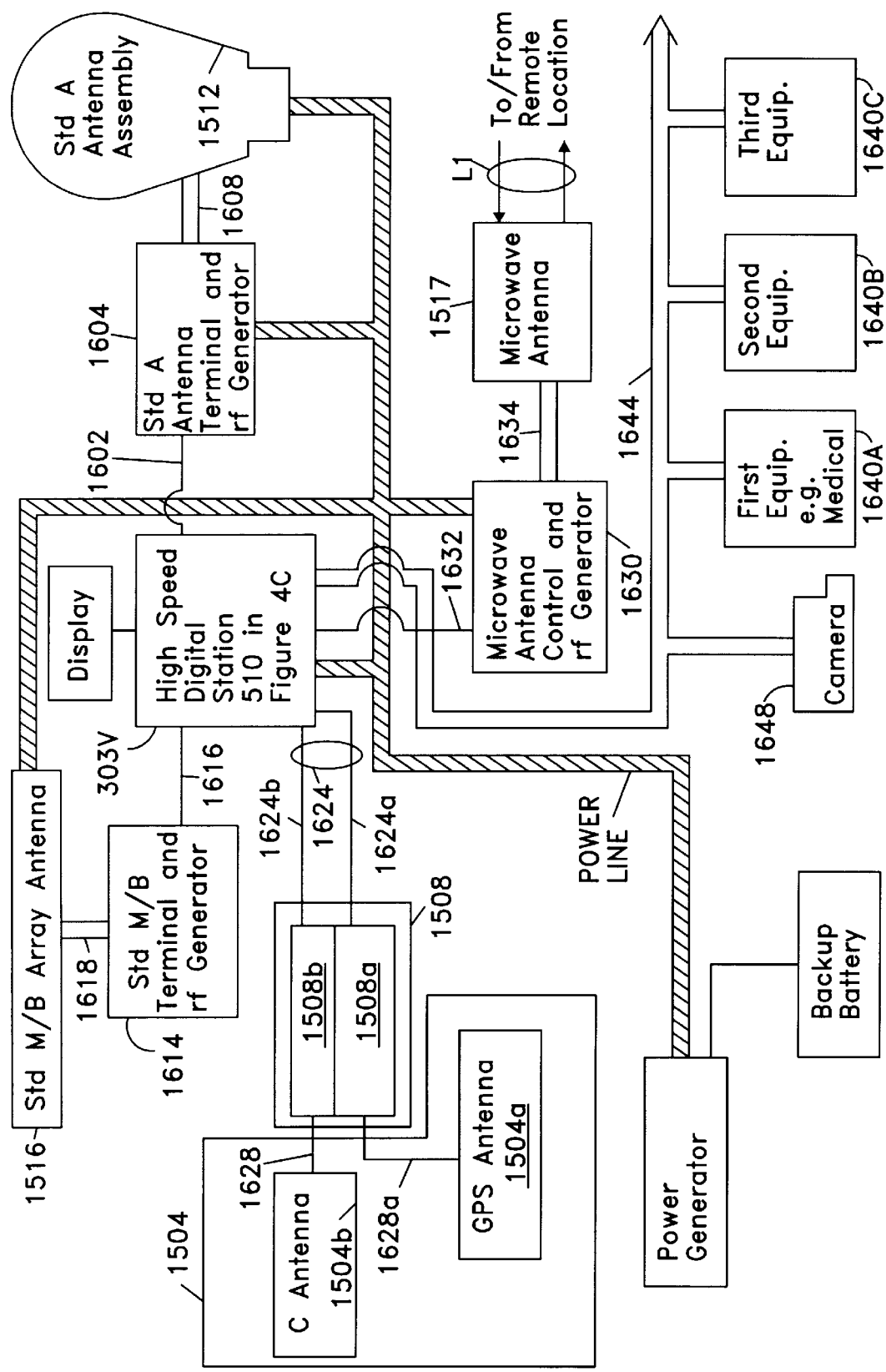
FIG. 6 shows various equipment and how they are interconnected in communications vehicle 305.

FIG. 6 shows various equipment and how they are interconnected in communications vehicle 305. That is, FIG. 6 is a block diagram of communications system 301 with digital station 303V as shown in FIG. 3A. As can be seen, digital station 303V is connected via cable 1602 to standard A antenna terminal and RF generator 1604. Digital information received via cable 1602 from high speed digital station 303V is used to generate microwave signals which are then transmitted to standard A antenna assembly 1512 via microwave guide 1608 and subsequently transmitted from antenna 1512 to satellite 309 (FIG. 5 or FIG. 3B). An example of standard A antenna terminal and RF generator is Inmarsat A MCS 9120.

High speed digital station 303V is also connected to standard M or B terminal and RF generator 1614 via cable 1616. Standard M or B terminal and RF generator 1614 in turn is coupled to standard M or B array antenna 1516 via microwave guide 1618. Digital information is received from high speed digital station 303V via cable 1616 by standard M or B terminal 1614 and processed to yield microwave signals which in turn are transmitted via microwave guide 1618 to array antenna 1516 and then out to satellite 309. An example of a standard M antenna terminal and RF generator is Inmarsat M or TerraStar-M, and a standard B antenna terminal and RF generator is the type sold by Satphone Model SP 1600.

Transmitter/receiver system 1508 is also coupled to high speed digital station 303V via cables 1624 (lines 1624a and 1624b). Gps antenna 1504a receives gps signals through line 1628a to gps receiver 1508a which processes the gps signals and outputs gps digital information to high speed digital station 303V. Inmarsat standard C transmitter/receiver 1508b is coupled to high speed digital station 303V via cable 1624b and antenna 1504b is coupled to standard C transmitter/receiver 1508b. Standard C transmitter/receiver 1508b can receive information via standard C antenna 1504b and cable 1628b from any Inmarsat C equipped station. Standard C transmitter/receiver 1508b can then transmit the gps information to any Inmarsat C equipped station which forwards this information to an end user by the local telephone company. Alternatively a TransVideo Electronics (TVE) patch system such as the patch system described in U.S. patent applications Ser. Nos. 08/085,329 and 08/047,089 (parent applications to this application) can be used to patch the standard C transmitter/receiver to the end user.

Standard A antenna terminal 1604 as well as standard M or B terminal 1614 can maintain satellite communications with satellite 309. Alternatively, station 303V can also process this gps information and outputs commands to standard A antenna terminal 1604 as well as standard M or B terminal 1614 to enable both terminals to adjust their respective antennas as vehicle 300 moves from location to location. An example gps receiver with a standard C transmiter/receiver (i.e., system 1504) is Global-C MDT-6000 by Mobile Telesystems which is a global C standard system with a gps option.

High speed digital station 303V is further coupled to microwave antenna control and RF generator 1630 via cable 1632. Microwave antenna control and RF generator 1630 in turn is coupled to microwave antenna 1517 via microwave guide 1634. Video or any other sensor information is received from transportable suitcase 510R1 via link L1 by microwave antenna 1517 and then transmitted through wave guide 1634 to microwave antenna control and RF generator 1630 which demodulates that information and transmits resulting digital information via cable 1632 to high speed digital station 303V. Similarly, digital video information from high speed digital station 303V can be transmitted via cable 1632 to microwave antenna control and RF generator 1630 which in turn outputs microwave on microwave guide 1634 to microwave antenna 1517 and microwave antenna 1517 in turn transmits microwave information via link L1 to transportable suitcase 510R1. This digital information can be received from first equipment 1640A or second equipment 1640B or third equipment 1640C which output digital signals on bus 1644 to high speed digital station 303V. Similarly, video information can be output from camera 1648 to bus 1644 and then to digital station 303V. Digital information output from equipment 1640A-1640C or from camera 1648 onto bus 1644 can be received by digital station 303V and in turn transmitted from digital station 303V to satellite 309 via one of terminal and RF generator 1604 and a standard M or B terminal RF generator 1614 as discussed above. However, any such digital information is compressed in high speed digital station 303V before being output to satellite 309 in a manner analogous to that discussed above with respect to FIGS. 4A–4D, as will be shown with respect to FIG. 7.

Figure 7:
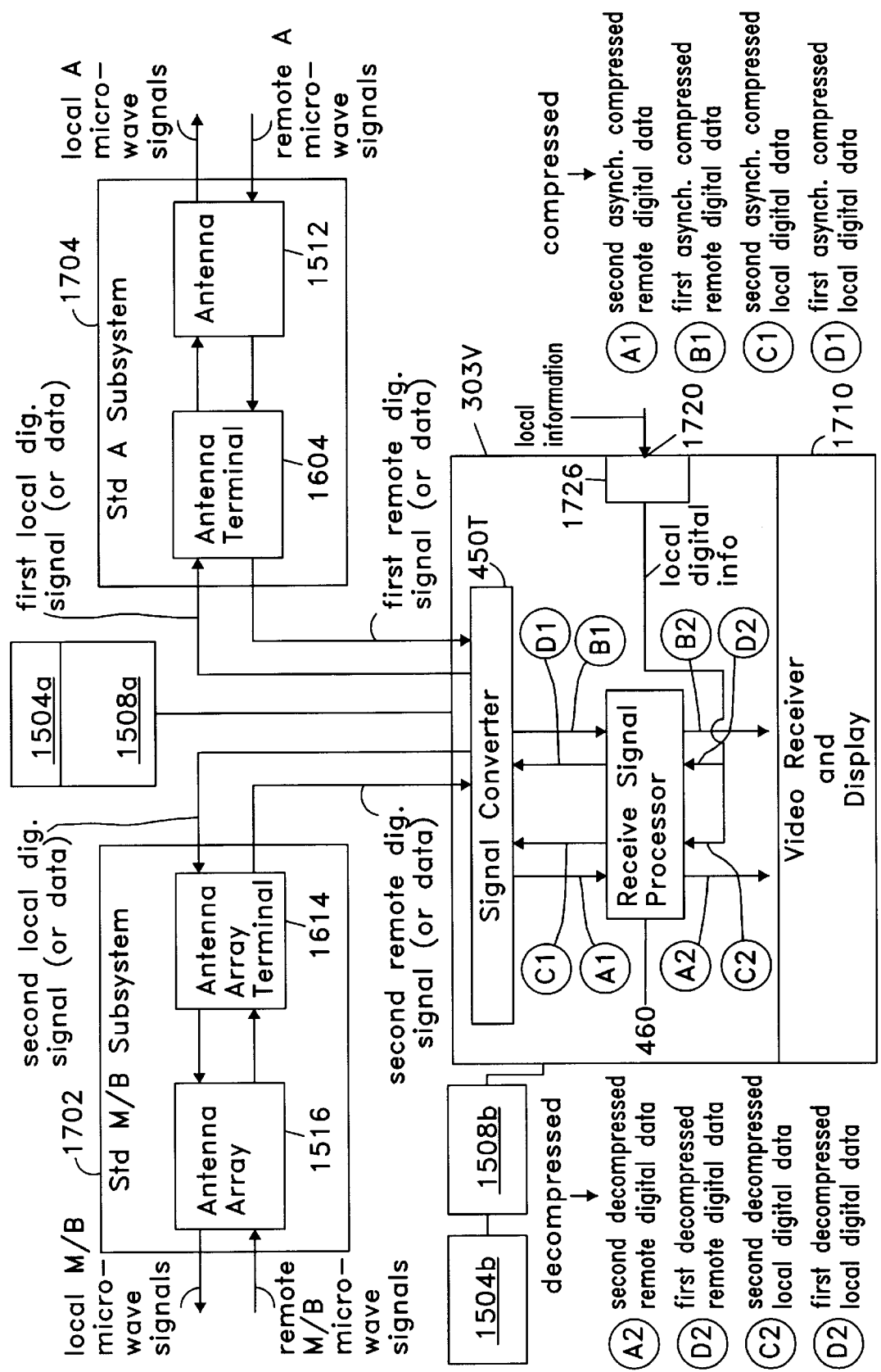
FIG. 7 shows a more detailed block diagram of the processing equipment in the global satellite communications vehicle.

FIG. 7 shows a more detailed block diagram of high speed digital station 303V and its relation to standard M/B subsystem 1702 comprised of antenna array 1516 and antenna array terminal 1614, as well as standard A subsystem 1704 comprising antenna 1512 and antenna terminal 1604. A video receiver and display 1710 is coupled to high speed digital station 303V which is comprised of a signal converter similar to signal converter 450T in FIG. 4A as well as a receive signal processor 460 corresponding to receive signal processor 460 of that same figure.

High speed digital station 303V interacts with standard A subsystem 1704, standard M/B subsystem 1702 and gps receiver controller 1508 as follows. Remote A microwave signals are received from a satellite (satellite 309 of FIG. 3B) by standard A subsystem 1704 and in particular antenna 1512. Standard A subsystem 1704 receives remote A microwave signals and transforms them into first remote digital signals (or data) which are output to high speed digital station 303V. Signal converter 450T then converts first remote digital signals (or data) to first asynchronous compressed remote digital signals (or data) and outputs those signals to receive signal processor 460. Receive signal processor 460 then decompresses the first asynchronous compressed remote digital signals (or data) and outputs first decompressed remote digital data to video receiver and display 1710 for display.

Remote M/B microwave signals are processed in a similar manner. Namely, remote M/B microwave signals received from a satellite (satellite 309 of FIG. 3B) and are transformed by standard M/B subsystem 1702 into second remote digital signals (or data). High speed digital station 303V receives these second remote digital signals (or data) at converter 450T and the latter converts those signals into second asynchronous compressed remote digital signals (or data). Receive signal processor 460 then receives the second asynchronous compressed remote digital signals (or data) and decompresses them and outputs second decompressed remote digital data to video receiver and display 1710 for display.

Microwave signals are output from communications system 301 as follows. Local information is input to high speed digital station 303V at input 1720. As discussed above, this can be information gathered by a video camera which is in vehicle 300 or which is remote to vehicle 300 (one of sensors 1530A–1530C of FIG. 5) coupled thereto by microwave link L1. High speed digital station 303V includes an analog to digital (A/D) converter 1726 which converts the local information to local digital information. This local digital information serves as either first decompressed local digital data or second decompressed local digital data which are eventually sent to satellite 309 by standard A subsystem 1704 or standard M/B subsystem 1702, respectively. For example, first decompressed local digital data is received by receive signal processor 460 which compresses that data and outputs first: asynchronous compressed local digital data. First asynchronous compressed local digital data is then received by signal converter 450T and converted into first local digital signals which are received by standard A subsystem 1704. Standard A subsystem 1704 converts the first local digital signals and outputs local A microwave signals to satellite 309.

Similarly, second decompressed local digital data is received by receive signal processor 460 and compressed into second asynchronous compressed local digital signals. Those second asynchronous compressed local digital signals are in turn received by signal converter 450T and converted into second local digital data. Standard M/B subsystem 1704 receives the second local digital data and converts them into local M/B microwave signals which are output to satellite 309. In all of the above cases microwave signals are compressed and decompressed in high speed digital station 303V and in particular in receive signal processor 460. In particular, all local microwave signals are signals which are compressed at receive signal processor 460 and will eventually be decompressed at a similar receive signal processor at a remote location. On the other hand, all remote microwave signals which are received from a receive signal processor in a high speed digital station at a remote location are decompressed by high speed digital station 303V and in particular receive signal processor 460. Consequently, remote microwave signals cannot be decompressed by receive signal processor 460 unless they underwent a corresponding compression at the remote location. Therefore, remote microwave signals cannot be intercepted by either a standard A subsystem or a standard M/B subsystem unless the receiving party knows the decompression algorithm used by the transmitting party. This is even more so the case if the receive signal processor at the remote location utilizes a digital encoding/scrambling algorithm. In such cases, even if the compression and decompression algorithms are known, the remote microwave signals cannot be processed into local digital information until a corresponding decoding and descrambling algorithm is performed on the decompressed digital data.

Figure 8:
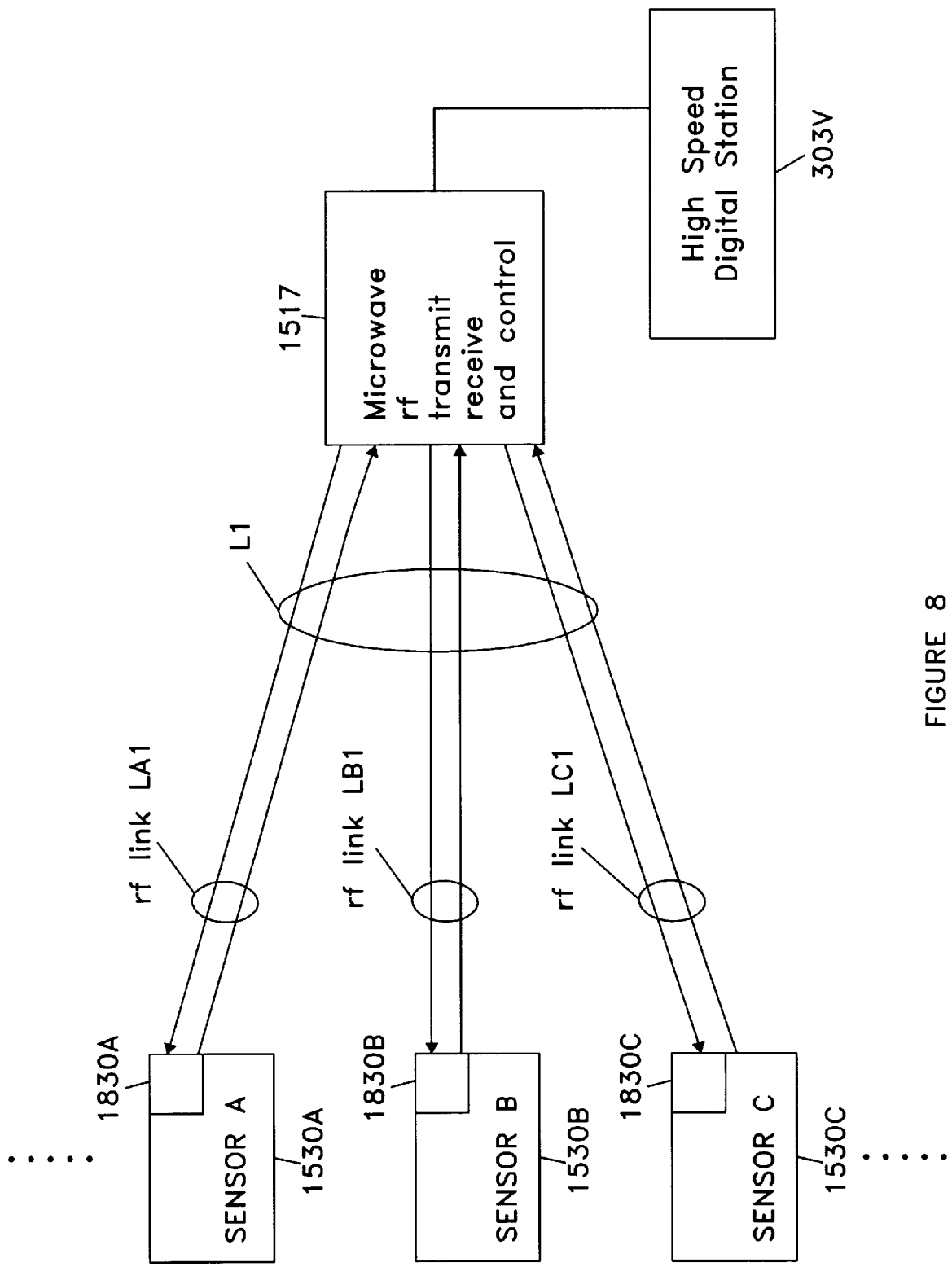
FIG. 8 shows an alternate approach to coupling sensors to the global satellite communications vehicle via L1.

FIG. 8 shows an alternate approach to coupling sensors 1530A–1530C to array 1517 via link L1. Namely, FIG. 8 shows three separate microwave transmitter/receivers 1830A–1830C for sensors 1530A–1530C, respectively. Here, link L1 is comprised of three separate links LA1, LB1, and LC1 for transmitter receivers 1830A, 1830B and 1830C, respectively. Again, sensor 1530A can be a video camera which has a transmitter/receiver 1830A which mounted either directly on camera 1530A or elsewhere, such as on a belt worn by an operator of camera 1530A.

Since each suitcase (307R1–307R3 of FIG. 3B) includes receive signal processors 440 or 460 (see, for example, the discussion of FIG. 4C above), any information transmitted from those remote digital suitcase systems can be compressed and/or encoded or scrambled. In so doing, communications between remote digital suitcase systems 307R1–307R3 can remain secure. Alternatively, transmitter/receiver 1830A–1830C can still provide secure communications if instead of transmitting microwaves, sensors 1830A–1830C transmit infrared or optical laser signals with the information modulated thereon. In such cases, since the diffraction of laser light would be significantly smaller than diffraction from microwave transmitters (i.e., the laser radiation would be transmitted in "beams"), communications between sensors 1530A–1530C and transmitter/receiver 1517 would remain secure even without any scrambling or encoding unless they were directly intercepted (line of sight) by a similar optical transmitter/receiver.

What is claimed is:

1. A mobile microwave system, comprising:
    a microwave subsystem for transmitting directly to a satellite first local microwave signals modulated with first local digital data while in motion with respect to earth and for receiving first remote microwave signals modulated with first remote digital data while in motion with respect to earth, wherein said microwave subsystem comprises an antenna assembly for transmitting said first local microwave signals and for receiving said first remote microwave signals capable of representing remote video signals;
    a high speed digital station coupled to said microwave subsystem, for receiving a video signal and for transforming and compressing said video signal into said first local digital data and for transforming and decompressing said first remote digital data into a first decompressed remote digital data; and
    a land vehicle for housing said microwave subsystem and said high speed digital station, said vehicle having a lower portion and a roof, wherein said first local microwave signals transmitted by said antenna assembly pass through said roof, wherein said microwave subsystem is adjustable in pitch and yaw relative to the land vehicle moving with respect to the earth on any terrain to establish a satellite communications link to the satellite using the first local microwave signals and the first remote microwave signals.

2. The mobile microwave system as claimed in claim 1, wherein said microwave subsystem further comprises:
    an antenna terminal coupled to said antenna assembly and said high speed digital station for demodulating said first microwave signals.

3. The mobile microwave system of claim 1, further comprising a power generator, wherein the microwave subsystem and the high speed digital station are coupled to the power generator.

4. The mobile microwave system as claimed in claim 1, further comprising a display unit coupled to said high speed digital station and said power generator, for displaying said first decompressed remote digital data.

5. A portable integrated receiving system for use with a satellite communications system to establish a satellite communications down-link, comprising:
    a microwave satellite receiver for directly receiving from a satellite in the satellite communications system, a modulated microwave satellite signal which has been modulated with a compressed digital signal, and for demodulating the modulated satellite microwave signal into the compressed digital signal while in motion with respect to earth;
    a received satellite signal processor for decompressing said compressed digital signal into first remote digital data being a remote video signal; and
    a land vehicle for housing said microwave satellite receiver and said received satellite signal processor, wherein said vehicle has a lower portion and an upper portion, wherein said modulated microwave satellite signal can pass through said upper portion, and wherein said microwave satellite receiver and said received satellite signal processor are adjustable in pitch and yaw relative to the land vehicle moving on any terrain with respect to the earth to establish the satellite communications link using the modulated microwave satellite signal.

6. An L band microwave system, comprising:
    a power generator;
    a standard A subsystem coupled to said power generator, including:
        an antenna assembly for transmitting A band local microwave signals and for receiving A band remote microwave signals; and
        a standard A antenna terminal coupled to said standard A antenna assembly for receiving, demodulating and processing said A band remote microwave signals to yield first remote digital signals, and for processing first local digital signals to generate said A band local microwave signals and for controlling said antenna assembly in accordance with gps data;
    a standard M subsystem coupled to said power generator, including:
        an array antenna for transmitting M band local microwave signals and for receiving M band remote microwave signals; and
        a standard M array antenna terminal coupled to said array antenna for receiving, demodulating and processing said M band remote microwave signals to yield second remote digital signals, for processing second local digital signals to generate said M band local microwave signals and for controlling said array antenna in accordance with said gps data;
    a high speed digital station coupled to said A band subsystem, said standard M subsystem and said power generator, including:
        signal converter for receiving and converting said first and second remote digital data and outputting first and second asynchronous compressed remote digital data, respectively, and for receiving and converting first and second asynchronous compressed local digital data to yield said first and second local digital data, respectively;
        receive signal processor for receiving, editing and decompressing said first and second asynchronous compressed remote digital data to yield first and second decompressed remote digital data and for compressing and editing first and second decompressed local digital data to yield said first and second asynchronous compressed local digital data; and
        video signal receiver and display coupled to said receive signal processor for receiving and displaying at least one of said first and a second decompressed remote digital data, and for receiving a video signal and transforming said video signal into said first and second decompressed local digital data and for displaying said video signal; microwave suitcase subsystem, including:

microwave transmitter for receiving an external video signal and transmitting a microwave signal modulated with said external video signal; and microwave receiver for receiving and demodulating said microwave signal to yield said video signal; gps subsystem coupled to said power generator, comprising:

gps antenna; and gps receiver coupled to said gps antenna and said high speed digital station, for determining location information of said vehicle and outputting said location information to said high speed digital station, as said gps data;

a vehicle for housing said power generator, said standard A subsystem, said standard M subsystem, said high speed digital station and said microwave receiver, said vehicle including a lower portion and an upper portion, wherein said upper portion passes L band microwaves; and video camera coupled to said video camera signal receiver via said microwave suitcase subsystem, for outputting said external video signal.

7. An L band microwave system, comprising:

a power generator;

a standard A subsystem coupled to said power generator for transmitting first local microwave signals modulated with first local digital data and for receiving and demodulating first remote microwave signals to yield first remote digital data;

a standard M subsystem coupled to said power generator for transmitting second local microwave signals modulated with second local digital data and for receiving and demodulating second remote microwave signals to yield second remote digital data;

a high speed digital station coupled to said standard A subsystem, said standard M subsystem and said power generator, including:

signal converter for receiving and converting said first and second remote digital data and outputting first and second asynchronous compressed remote digital data, respectively, and for receiving and converting first and second asynchronous compressed local digital data to yield said first and second local digital data, respectively;

receive signal processor for receiving, editing and decompressing said first and second asynchronous compressed remote digital data to yield first and second decompressed remote digital data and for compressing and editing first and second decompressed local digital data to yield said first and second asynchronous compressed local digital data; and video signal receiver and display coupled to said receive signal processor for receiving and displaying at least one of said first and second decompressed remote digital data and for receiving a video signal and for transforming said video signal into said first and second decompressed local digital data and for displaying said video signal;

microwave subsystem, including: microwave transmitter for receiving an external video signal and transmitting a microwave signal modulated with said external video signal; and microwave receiver for receiving and demodulating said microwave signal to yield said video signal;

a vehicle for housing said power generator, said standard A subsystem, said standard M subsystem, said high speed digital station and said microwave receiver, said vehicle including a lower portion and an upper portion, wherein microwaves with energies in the L band can pass through said upper portion; and video camera coupled to said video camera signal receiver via said microwave subsystem for outputting said external video signal.

8. A mobile microwave system, comprising:

a microwave subsystem for transmitting first local microwave signals modulated with first local digital data while in motion with respect to earth and for receiving first remote microwave signals modulated with first remote digital data while in motion with respect to earth;

a high speed digital station coupled to said power generator and said microwave subsystem, for receiving a video signal and for transforming and compressing said video signal into said first local digital data and for transforming and decompressing said first remote digital data into a first decompressed remote digital data;

a vehicle for housing said microwave subsystem and said high speed digital station, said vehicle having a lower portion and an upper portion, wherein said first local microwave signals can pass through said upper portion;

a GPS antenna;

a GPS receiver coupled to said GPS antenna and said high speed digital station, for determining location information of said vehicle and outputting said location information to said high speed digital station, as GPS data;

a standard C antenna; and a standard C transmitter and receiver, coupled to at least one of said GPS receiver and said high speed digital station for receiving said location information and transmitting said location information to a satellite.

9. The mobile microwave system of claim 8, further comprising a power generator, wherein the microwave subsystem and the high speed digital station are coupled to the power generator.

10. A portable integrated transmitting system for use with a satellite communications system to establish a satellite communications up-link, comprising:

a microwave satellite transmitter for directly transmitting to a satellite in the satellite communications system, a modulated microwave satellite signal which has been modulated with a compressed digital signal, and for modulating the compressed digital signal into the modulated satellite microwave signal while in motion with respect to earth;

a transmit satellite signal processor for compressing a video signal into said compressed digital signal; and a land vehicle for housing said microwave satellite transmitter and said transmit satellite signal processor, wherein said vehicle has a lower portion and an upper portion, wherein said modulated microwave satellite signal passes through said upper portion, and wherein said microwave satellite transmitter and said transmit satellite signal processor are adjustable in pitch and yaw relative to the land vehicle moving on any terrain with respect to the earth to establish the satellite communications link using the modulated microwave satellite signal.

* * * * *